United States Patent
Ohki et al.

(10) Patent No.: US 6,363,100 B1
(45) Date of Patent: Mar. 26, 2002

(54) RADIO DATA COMMUNICATION SYSTEM USING SPREAD SPECTRUM SCHEME

(75) Inventors: Masahiro Ohki; Yukitsuna Furuya, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/363,315

(22) Filed: Dec. 23, 1994

(30) Foreign Application Priority Data

Dec. 24, 1993 (JP) ............................................. 5-326773

(51) Int. Cl.[7] .......................... H04K 1/00; H04L 27/22
(52) U.S. Cl. ........................ 375/141; 375/332; 329/304
(58) Field of Search ................................. 375/200, 206, 375/259, 279, 281, 130, 141, 146, 147, 329, 332, 280; 329/304, 306

(56) References Cited

U.S. PATENT DOCUMENTS

| | | | | |
|---|---|---|---|---|
| 4,041,391 A | * | 8/1977 | Deerkoski | .................... 375/281 |
| 4,613,976 A | * | 9/1986 | Sewerinson et al. | .... 375/281 X |
| 5,170,410 A | * | 12/1992 | Gressier et al. | ............. 375/206 |
| 5,241,562 A | * | 8/1993 | Partyka et al. | ............... 375/206 |
| 5,321,721 A | * | 6/1994 | Yamaura et al. | ............ 375/205 |
| 5,327,455 A | * | 7/1994 | De Gaudenzi et al. | ...... 375/205 |

FOREIGN PATENT DOCUMENTS

| JP | 4273632 | 9/1992 |
|---|---|---|
| JP | 4360434 | 12/1992 |

* cited by examiner

*Primary Examiner*—Tesfaldet Bocure
(74) *Attorney, Agent, or Firm*—Sughrue Mion, PLLC

(57) ABSTRACT

In a transmission side, a k-bit parallel signal is divided into n signals, which are respectively encoded and then phase-shifted so as to causing a mutual phase difference of $\pi/2^n$. Spectrum spreading is performed on the phase-shifted encoded signals which are combined together to produce a transmission digital signal. In a receiving side, reverse spreading is performed on a receiving signal to produce reverse-spread signals, which are given the phase difference to cancel the phase shift of the transmission side, and then decoded. Thus, the original k-bit parallel signal is reproduced in the receiving side.

15 Claims, 7 Drawing Sheets

RADIO DATA COMMUNICATION SYSTEM USING SPREAD SPECTRUM SCHEME

BACKGROUND OF THE INVENTION

1. Field of the Invention

The present invention relates to a radio communication system using a spread spectrum scheme and, more specifically, to an improvement of a spread spectrum radio communication system used in, for example, a radio LAN (local area network), and a mobile communication system.

2. Description of the Prior Art

In recent years, the spread spectrum scheme attracts attention for use in a radio communication system and as a communication means using very weak electromagnetic waves. Since the spread spectrum scheme has inherent resistance to multipath interference and allows multiple access within the limited bandwidths available, it is expected to play an important role in the field of mobile communications and premise radio communications. Several spread spectrum schemes have been known including the direct-sequence (DS) scheme, the frequency hopping (FH) scheme and a combination of those schemes.

FIG. 1 shows a transmission side configuration of the DS scheme. A serial data signal is converted to a k-bit parallel data signal by a serial-to-parallel converter 1, and the parallel data signal is modulated or encoded by a first modulator 2. The output signal of the first modulator 2 is then multiplied in a multiplier 4 by a spreading code that is supplied from a spreading code generator 3. The signal thus processed is transmitted through a radio transmitter 5 and an antenna 6.

In the above operation, a relationship $$W = 2UR_b, \quad R_a = mR_b \quad (1)$$

is obtained where $R_a$ (bits/sec) is a data rate of the serial data signal, $R_b$ (symbols/sec) is a symbol rate of the output signal of the first modulator, W (Hz) is a bandwidth of the spectrum-spread signal, U is a spectrum spreading ratio, and m is a multi-value index of the first modulator 2.

From Equation (1), the data rate $R_a$ of the serial data signal is expressed as $$R_a = mW/2u \quad (2)$$

In a premise radio communication system such as a wireless LAN, the serial data signal is required to be transmitted at high speed to secure matching with a cable LAN. As is understood from Equation (2), the following methods are conceivable to increase the transmission speed of the serial data signal.

a) Increase the spread bandwidth W.

b) Decrease the spectrum spreading ratio U.

c) Increase the number of the multi-value index m of the first modulation.

Usually, there exist some limitations on methods a) and b). For example, in the case of an ISM (industrial, scientific and medical) band radio LAN in Japan, there are limitations of bandwidth $W \leq 26$ MHz and spreading ratio $U \geq 10$. Therefore, to increase the transmission speed, method c) should be taken. Conventionally, QuadriPhase-Shift Keying (QPSK) (m=2) is employed as the first modulation in the DS system. To increase the transmission speed, the multi-value index m of the first modulation should be increased by employing 8PSK (1.5-fold) or 16PSK (2-fold). But in such cases, since distances between constellation signal points are reduced, the bit error rate increases in proportion to the multi-value index m, provided the signal-to-noise ratio (S/N) is kept the same.

SUMMARY OF THE INVENTION

An object of the present invention is to provide a radio communication system which enables high-speed data communication under limitations on frequency bands available and a spectrum spreading ratio.

Another object of the present invention is to provide a radio communication system which enables high-speed data communication without increasing the bit error rate.

Still another object of the invention is to provide a radio data transmitter and receiver which enable high-speed data communication in a radio communication system in which there are limitations on a frequency band used and a spectrum spreading ratio.

In the transmission side of a radio data communication system according to the invention, a k-bit parallel signal is divided into n signals each having k/n bits, which are encoded and then given a phase difference of $\pi/2^n$ between any two arbitrary consecutively encoded signals. Spectrum spreading is performed on the respective phase-shifted signals and then the spectrum spread signals are combined together to produce a transmission digital signal. In the receiving side, reverse spreading is performed on a receiving signal to produce n reverse-spread signals, and the reverse-spread signals are given the phase difference of $\pi/2^n$ to cancel the phase shift of the transmission side. The respective phase-shifted signals are demodulated or decoded to reproduce the original k-bit parallel signal.

More specifically, according to the invention, the transmission side of the radio data communication system comprises: a converter for converting a data signal to be transmitted to a k-bit parallel signal; encoders for mapping each of k/n-bit signals to signal point locations of a predetermined modulation scheme such as QPSK, the k/n-bit signals being produced by dividing the k-bit parallel signal into n parts; phase shifters for causing a phase difference of a multiple of $\pi/2^n$ between any two arbitrarily encoded signals adjacent to one other among the n encoded signals; spectrum spreading circuits for spreading each of the n phase-shifted encoded signals; an adder for combining the n spectrum spread signals to generate a digital transmission signal; a radio transmitter for transmitting a transmission wave by performing, for instance, quadrature modulation based on the digital transmission signal.

According to the invention, the receiving side of the radio data communication system comprises a radio receiver for demodulating a receiving wave by, for instance, quadrature demodulation to produce a digital receiving signal; spectrum reverse-spreading circuits for reverse-spreading the digital receiving signal to produce n reverse-spread digital signals; phase shifters for causing a phase difference of $\pi/2^n$ for cancelling the phase shift of the transmission side; and decoders for decoding each of the n phase-shifted digital signals according to a demodulation scheme corresponding to the predetermined modulation scheme, to thereby reproduce the k-bit parallel signal.

Therefore, according to the radio data communication system of the invention, the data transmission speed can be increased without increasing the multi-value index m in the first modulation. It is sufficient to use a QPSK encoder for a first modulation. Therefore, the high-speed transmission can be achieved without increasing the bit error rate.

DESCRIPTION OF THE PREFERRED EMBODIMENTS

Figure 1:
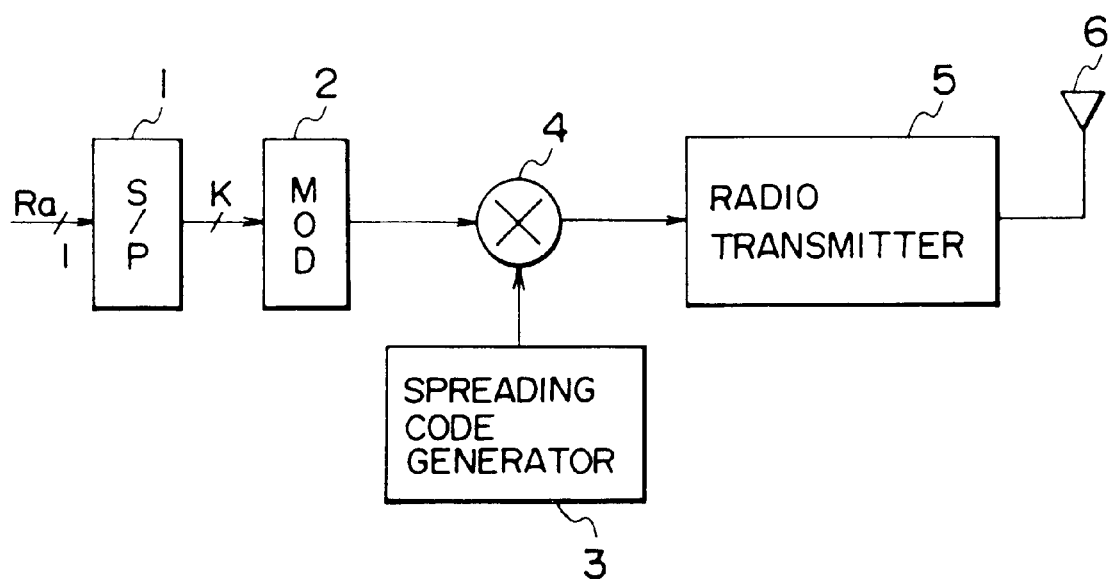
FIG. 1 is a block diagram showing a general configuration of a conventional radio transmitting apparatus.
Figure 2:
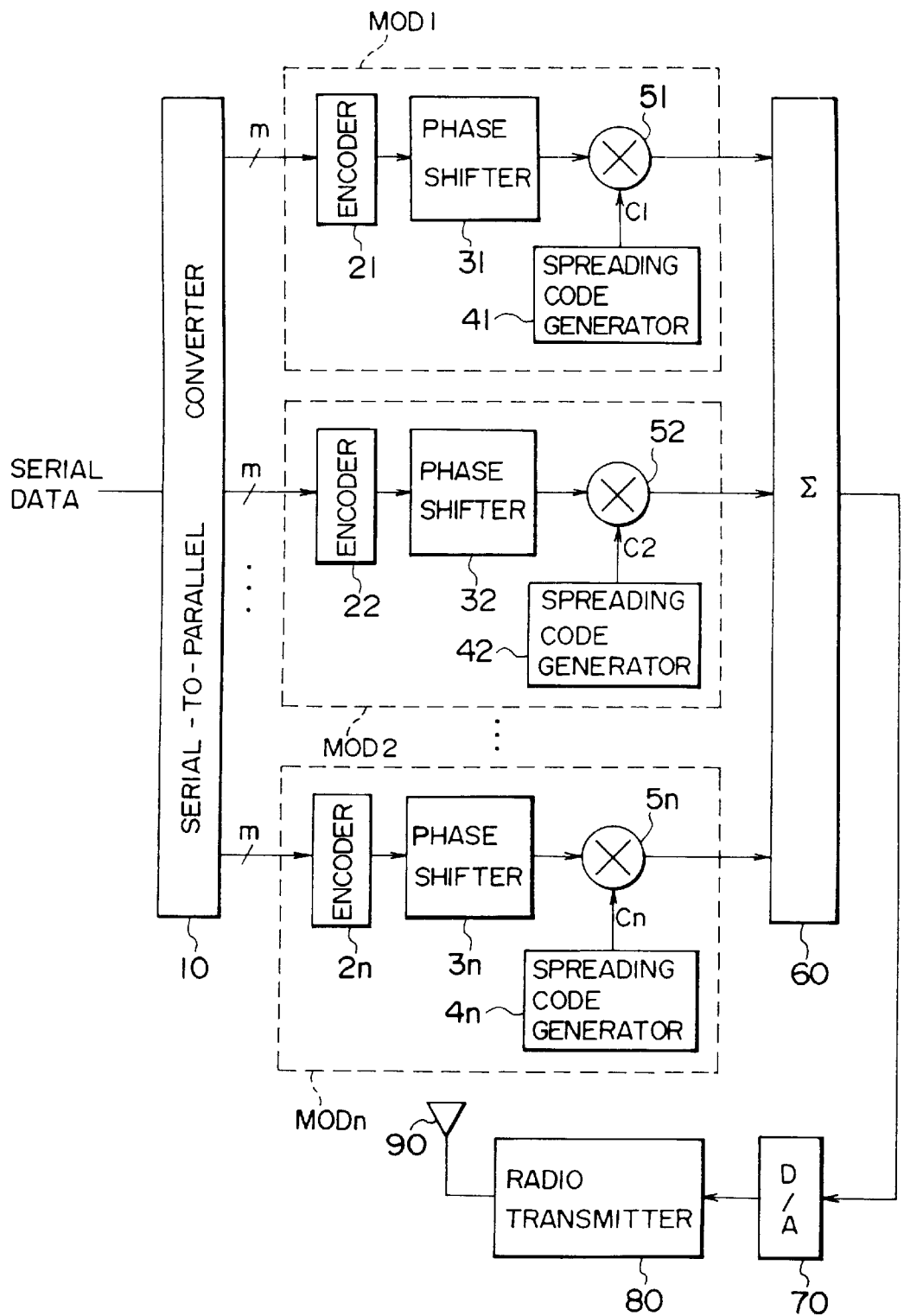
FIG. 2 is a general block diagram showing a radio communication transmitting apparatus according to the present invention.

FIG. 2 shows a general configuration of a radio communication transmitting apparatus according to the present invention. A bit serial signal is converted to a k-bit parallel signal by a serial-to-parallel (S/P) converter 10. The k-bit parallel signal is divided into n parallel signals of m (=k/n) bits. The n m-bit parallel signals are respectively output to modulating systems MOD1–MODn, in each of which encoding (or mapping) and spectrum spreading are performed. Digital signals output from the respective modulating systems MOD1–MODn are added together by an adder 60, and then the digital output signal of the adder 60 is converted to an analog signal by a D/A converter 70. The circuit from the S/P converter 10 to the adder 60 is a digital circuit.

A quadrature modulator of a radio transmitter 80 quadrature-modulates two orthogonal carrier waves by the two information signals (I and Q) produced by the D/A converter 70, respectively, and the two modulated signals are summed up and transmitted to an antenna 90.

Each modulating system MODi ($1 \leq i \leq n$) is comprised of an encoder 2i, a phase shifter 3i, a spreading code generator 4i, and a multiplier 5i. The encoder 2i performs prescribed digital modulation on the received m-bit parallel signal to thereby map the m-bit parallel signal to signal point locations of the modulation scheme used. Examples of the modulation scheme are PSK (phase shift keying) and trellis modulation.

The digital signal encoded by the encoder 2i is output to the phase shifter 3i. The phase shifter 3i causes a phase difference $\pi/2^n$ between the output of the encoder 2i and that of the encoder 2i+1. For example, where the phase shift P1 of the phase shifter 31 is 0, the phase shift P2 of the phase shifter 32 is set at $\pi/2^n$, the phase shift P3 of the phase shifter 33 is set at $2\pi/2^n$, the phase shift P4 of the phase shifter 34 is set at $3\pi/2^n$, and so forth.

The spreading code generator 4i generates a spreading code $C_i$ to be used for spectrum spreading. As is well known, the spreading code $C_i$ is PN (pseudorandom noise). To suppress the bit error rate under a multi-path environment, it is desired that the spreading codes $C_1$–$C_n$ be a set of codes in which each auto-correlation function has a peak value at a synchronized position and has a small value at the other positions and the cross-correlation function has values close to 0 (there is almost no correlation). The spectrum spreading is performed by multiplying together such a spreading code $C_i$ and an output of the phase shifter 3i using the multiplier 5i.

In the invention, the k-bit parallel signal is divided into n signals, which are individually subjected to the encoding and spectrum spreading and then combined together. Therefore, the invention can avoid the problem that the bit error rate is increased by the increased multi-value index in the first modulation.

Figure 3:
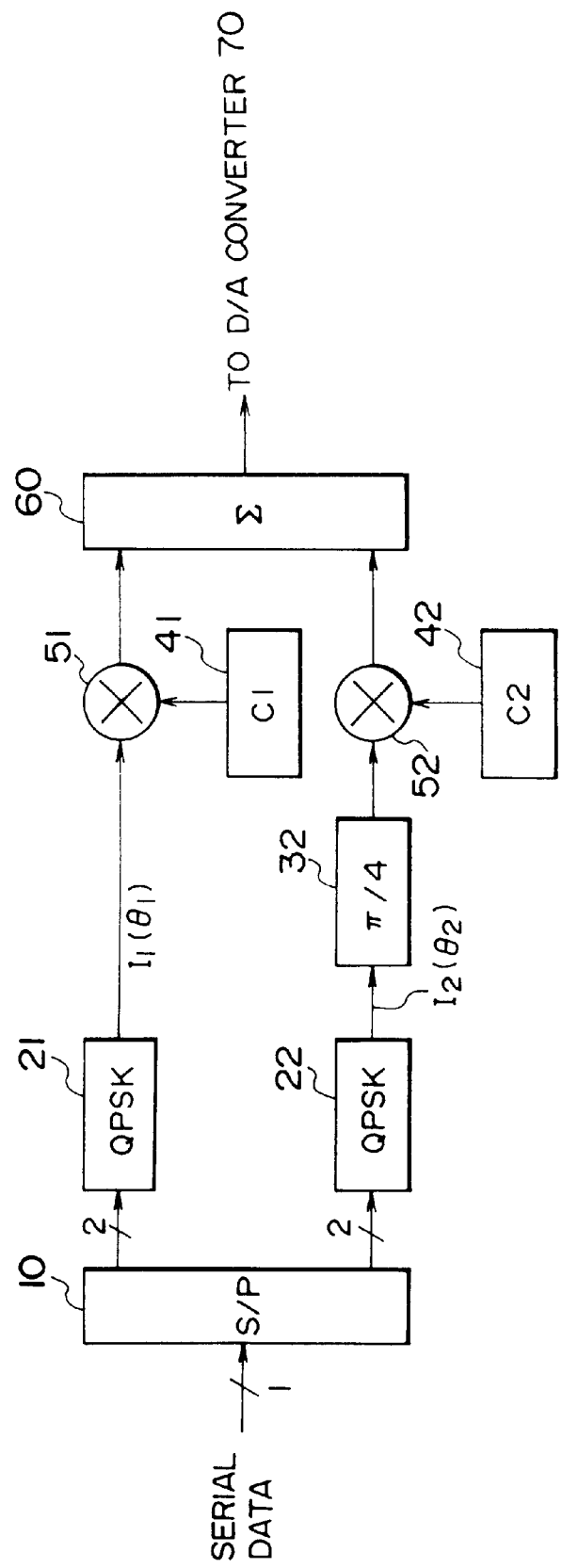
FIG. 3 is a block diagram showing a configuration of a radio communication transmitting apparatus according to a first embodiment of the invention.

Referring to FIG. 3, a detailed description will be made of the operation of an embodiment in which n and m are set at 2 and the modulation scheme of the encoder 2i is QPSK (quadrature phase shift keying). For simplicity of the drawing, output channels I and Q of each QPSK encoder are represented together as I($\theta$).

First, a serial data signal is converted to a 4-bit parallel signal by a serial-to-parallel converter 10. Two-bit portions of the 4-bit parallel signal are respectively output to the QPSK encoders 21 and 22, where they are subjected to QPSK modulation. Only the encoded output signal $I_2(\theta_2)$ of the QPSK encoder 22 is $\pi/4$ phase-shifted by a phase shifter 32 to produce a phase difference of $\pi/4$ between the output $I_1(\theta_1)$ of the QPSK encoder 21 and the output $I_2(\theta_2)$ of the QPSK encoder 22. The phase shifter 31 of FIG. 2 can be omitted because, as described later, it is sufficient that the output signals $I_1$ and $I_2$ of the QPSK encoders 21 and 22 have a phase difference of $\pi/4$ therebetween.

Then, a multiplier 51 multiplies together a spreading code $C_1$ generated by a spreading code generator 41 and the output signal $I_1(\theta_1)$ of the QPSK encoder 21, and a multiplier 52 multiplies together a spreading code $C_2$ generated by a spreading code generator 42 and the output signal of the phase shifter 32. Outputs of the multipliers 51 and 52, i.e., spectrum-spread signals are combined with each other by an adder 60, and then the combined digital signal is converted to an analog signal by a D/A converter 70, and finally transmitted via a radio transmitter 80 and an antenna 90.

In this embodiment, the reason that the phase shifter 32 is connected to the QPSK encoder 22 is as follows. Now, the output signals of the QPSK encoders 21 and 22 are represented by $I_n(\theta)$ and the combined output signal of the adder 60 is represented by s(t), where $I_n$=exp(j$\theta$n), $\theta$n: $\pi/4$, $-\pi/4$, $3\pi/4$, $-3\pi/4$(n=1, 2).

If the QPSK-encoded signals $I_1(\theta_1)$ and $I_2(\theta_2)$ themselves were subjected to spectrum spreading using the spreading codes $C_1(t)$ and $C_2(t)$ and the resulting spread signals were combined together by the adder 60, then the combined signal s(t) would be expressed as $$s(t)=I_1(\theta_1)\cdot C_1(t)+I_2(\theta_2)\cdot C_2(t).$$

Figure 4A:
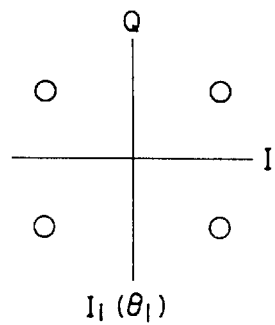
FIGS. 4A and 4B show signal point locations of output signals of respective QPSK encoders.
Figure 4B:
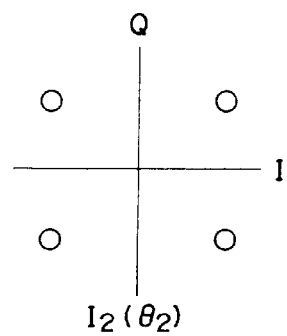
Figure 4C:
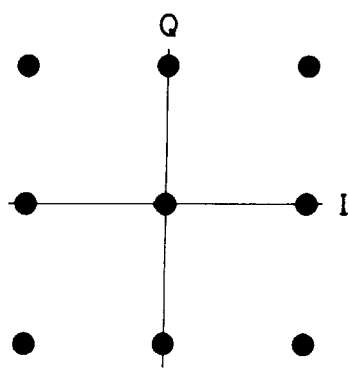
FIG. 4C shows signal point locations of a signal produced by adding together the output signals of the two QPSK encoders.
Figure 5A:
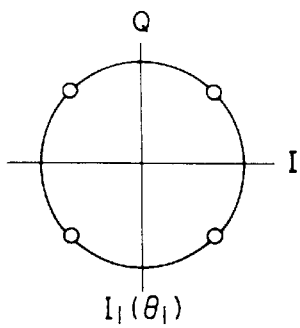
FIG. 5A shows signal point locations of an output signal of a QPSK encoder.
Figure 5B:
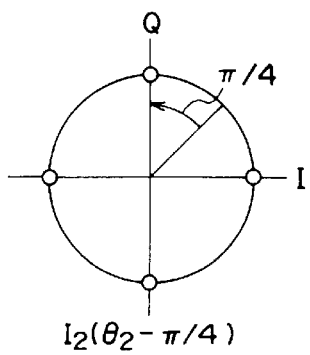
FIG. 5B shows signal point locations of an output signal of a $\pi/4$ phase shifter.

Since $I_1(\theta_1)$ and $I_2(\theta_2)$ are arranged in the same manner on a phase plane as shown in FIGS. 4A and 4B, respectively, one of signal points of the combined signal s(t) is located at the origin of the phase plane as shown in FIG. 4C. Since the origin represents a state of zero energy, such a signal cannot be received. To avoid any signal point of the combined signal s(t) from being located at the origin of the phase plane, the phase of the encoded signal $I_2(\theta_2)$ of the QPSK encoder 22 is shifted by $\pi/4$ by the phase shifter 32 (see FIG. 5B). As a result, the combined signal s(t) is expressed as $$s(t)=I_1(\theta_1)\cdot C_1(t)+I_2(\theta_2-\pi/4)\cdot C_2(t).$$

Figure 5C:
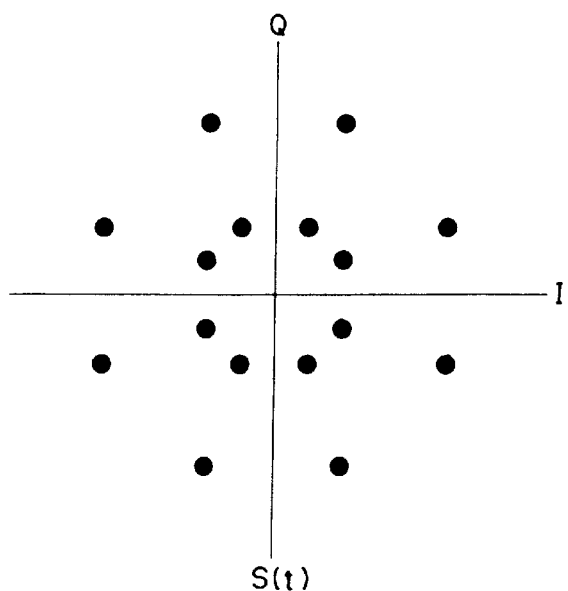
FIG. 5C shows signal point locations of a signal produced by adding together the output signals of the QPSK encoder and the $\pi/4$ phase shifter.

FIG. 5C shows signal point locations of s(t). As is apparent from FIG. 5C, all the signal points are located on the two concentric circles on the phase plane; that is, no signal point is located at its origin.

Furthermore, in this embodiment, the 4-bit parallel signal is divided into two signals, which are individually subjected to the QPSK encoding and spectrum spreading. Therefore, the data rate $R_a$ of the serial data signal is represented as $$R_a=2mR_b.$$

By making a comparison with Equation (1), it is understood that, if the spread bandwidth W and the spectrum spreading ratio U are kept the same, the data rate of the serial data signal can be made two times that of the conventional apparatus even with the encoders being of the same QPSK scheme.

The above description is directed to the case of k=4. To further increase the transmission speed, k may be increased to 6 (3-fold speed), 8 (4-fold speed), and so forth while employing the same QPSK encoding (m=2). That is, the transmission speed can further be increased with the use of the QPSK encoder by increasing the number of modulation systems MOD1-MODn each of which is comprised of the QPSK encoder $2i$, the phase shifter $3i$, the spreading code generator $4i$ and the multiplier $5i$.

It should be noted that the spreading codes $C_1$–$C_i$ generated by the spreading code generators $41$–$4i$ are of a good characteristic such that each auto-correlation function has a peak value at a synchronized position and small values at the other positions and the cross-correlation function exhibits almost no correlation.

Figure 6:
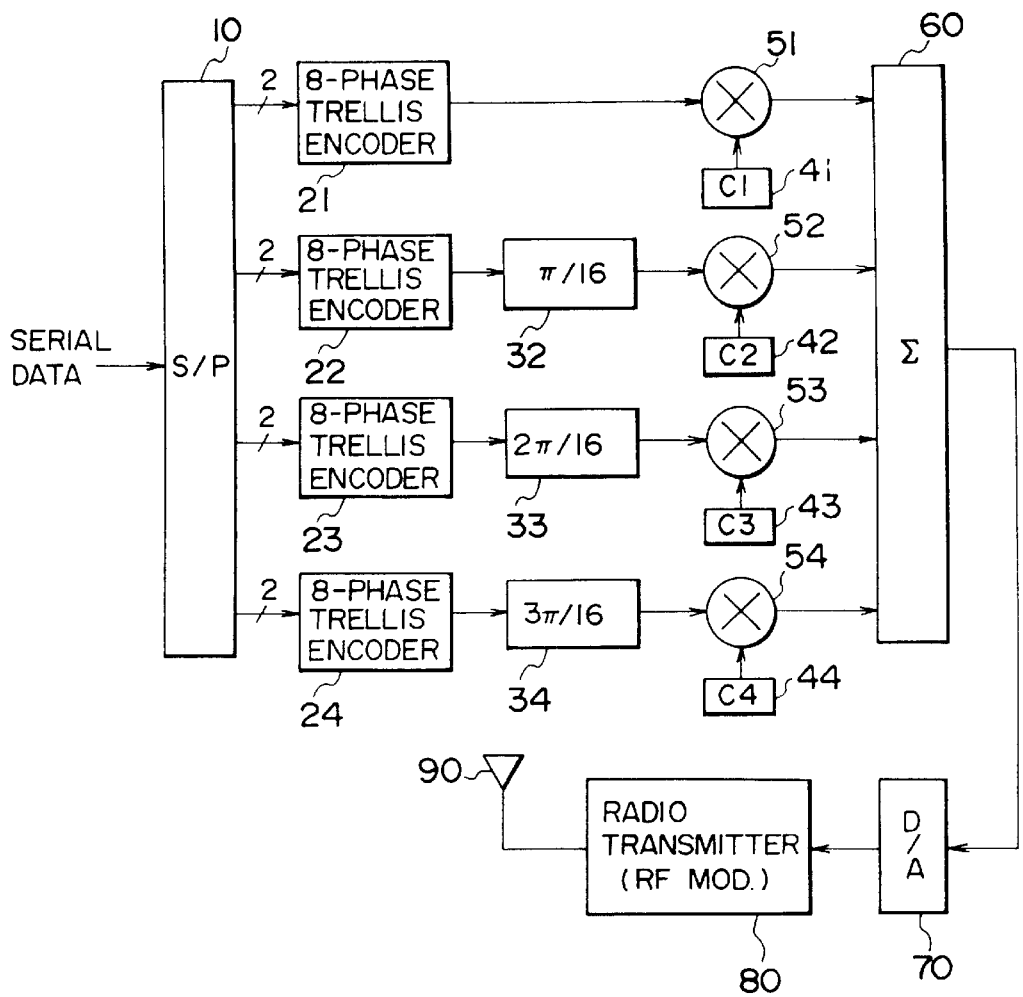
FIG. 6 is a block diagram showing a configuration of a radio communication transmitting apparatus according to a second embodiment of the invention.

FIG. 6 shows a second embodiment of the invention. A bit serial signal is converted to an 8-bit parallel signal by a serial-to-parallel converter 10. The 8-bit parallel signal is then divided into four 2-bit parallel signals, which are input to respective 8-phase trellis encoders 21–24.

While the 8-phase trellis modulation provides the same transmission speed as the QPSK modulation, it has an advantage of a lower error rate because of its superior noise characteristics. For example, with a $10^{-5}$ BER (bit error rate), the Signal-to-Noise ratio of the 8-phase trellis modulation is about 5 dB larger than that of the QPSK modulation.

Digital signals produced by the 8-phase trellis encoders 22–24 are input to phase shifters 32–34, respectively. The phase shifters 32–34 need to produce a phase difference of $\pi/2^n$ (n=4), phase shifts of the phase shifters 32–34 should be $\pi/16$, $2\pi/16$ and $3\pi/16$, respectively.

It is desired that spreading codes $C_1$–$C_4$ be a code set in which each auto-correlation function has a peak value at a synchronized position and has small values at the other positions and the cross-correlation function has values close to 0 (there is almost no correlation).

In this embodiment, an 8-bit parallel signal is divided into four 2-bit signals, which are individually encoded and subjected to the spectrum spreading. Therefore, the data rate $R_a$ of the serial data signal becomes equal to $4mR_b$, which means a transmission speed four times higher than that of the conventional apparatus. Further, by virtue of using the 8-phase trellis modulation, the error rate can be improved from the case of using the QPSK modulation.

Figure 7:
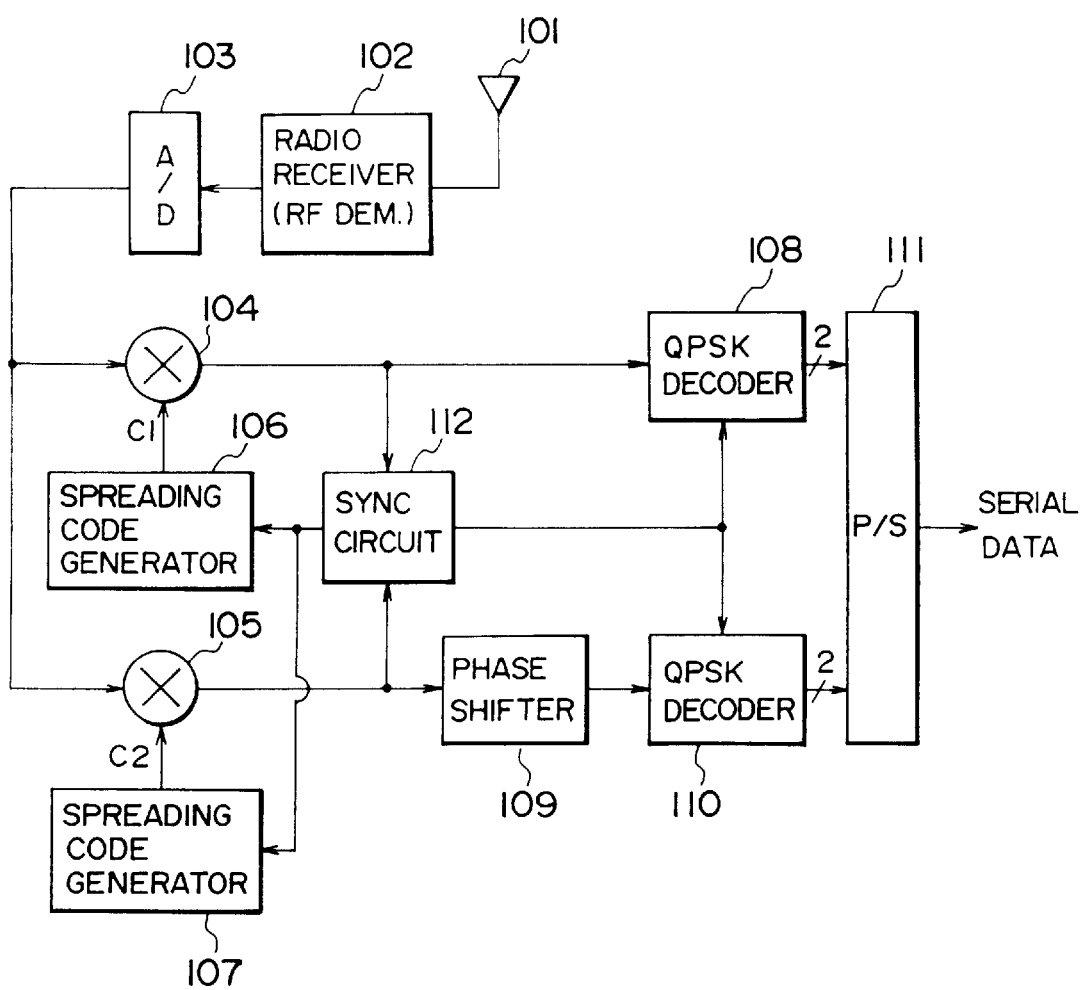
FIG. 7 is a block diagram showing a configuration of a radio communication receiving apparatus according to an embodiment of the invention.

FIG. 7 is a block diagram showing a receiving apparatus according to an embodiment of the invention. This receiving apparatus corresponds to the transmitting apparatus shown in FIG. 3.

A radio wave is received by a radio receiver 102 via an antenna 101. Quadrature-demodulation of the received wave is performed by a quadrature demodulator in the radio receiver 102. A demodulated receiving signal is supplied to an A/D converter 103. A digital output signal of the A/D converter 103 is output to correlators 104 and 105, where reverse spreading is performed by use of spreading codes $C_1$ and $C_2$ that are generated by spreading code generators 106 and 107, respectively. The reverse spread signal is output from the correlator 104 to a QPSK decoder 108, and the reverse spread signal is output from the correlator 105 to a QPSK decoder 110 after being phase-shifted by $\pi/4$ by the phase shifter 106. Decoded 2-bit parallel signals are output from the QPSK decoders 108 and 110 to a parallel-to-serial (P/S) converter 111, where they are converted to a serial signal as a baseband signal. A sync circuit 112 extracts a transmission-side symbol timing signal based on the reverse-spread output signals of the correlators 104 and 105. The extracted symbol timing signal is supplied to the spreading code generators 106 and 107 and the QPSK decoders 108 and 110.

Now, the receiving signal is represented by r(t) and the correlation output signals of the correlators 104 and 105 are represented by u1(t) and u2(t), respectively. The receiving signal r(t) is expressed as $$r(t)=s(t)+n(t)$$

where s(t) is a transmission signal and n(t) is channel noise. Neglecting the term n(t) to simplify the discussion, u1(t) and u2(t) are expressed as $$u_1(t) = \frac{1}{T_0}\int_{-\frac{2}{T_0}}^{\frac{2}{T_0}} s(\tau)c_1(t-\tau)d\tau$$

$$= \frac{1}{T_0}\int_{-\frac{2}{T_0}}^{\frac{2}{T_0}} c_1(\tau)c_1(t-\tau)d\tau +$$

$$\frac{1}{T_0}\int_{-\frac{2}{T_0}}^{\frac{2}{T_0}} c_2(\tau)c_1(t-\tau)d\tau$$

$$u_2(t) = \frac{1}{T_0}\int_{-\frac{2}{T_0}}^{\frac{2}{T_0}} c_1(\tau)c_2(t-\tau)d\tau +$$

$$\frac{1}{T_0}\int_{-\frac{2}{T_0}}^{\frac{2}{T_0}} c_2(\tau)c_2(t-\tau)d\tau$$

where $T_0=1/R_b$.
If a cross-correlation between the spreading codes $C_1$ and $C_2$ is close to no correlation as mentioned above, the following relationships are obtained:

$$u_1(t) \approx \frac{1}{T_0}\int_{-\frac{2}{T_0}}^{\frac{2}{T_0}} c_1(\tau)c_1(t-\tau)d\tau = I_1(\theta_1)$$

$$u_2(t) \approx \frac{1}{T_0}\int_{-\frac{2}{T_0}}^{\frac{2}{T_0}} c_2(\tau)c_2(t-\tau)d\tau = I_2\left(\theta_2 - \frac{\pi}{4}\right)$$

These equations teach that the receiving signal can be separated into the signals $I_1(\theta_1)$ and $I_2(\theta_2-\pi/4)$ by the correlators 104 and 105 correlating the receiving signal with the spreading codes $C_1$ and $C_2$, respectively. The signal $I_1(\theta_1)$ is decoded by the QPSK decoder 108. On the other hand, since the signal $I_2(\theta_2-\pi/4)$ has been subjected to the rotation of $\pi/4$ in the phase shifter 32 on the transmission side, it is now rotated by $-\pi/4$ in the phase shifter 109, and then decoded by the QPSK decoder 110. It is to be noted that the spreading code generating timing of the spreading code generators 104 and 105 and the decoding timing of the QPSK decoders 108 and 110 are all synchronized with the symbol timing that is extracted by the sync circuit 112.

A receiving apparatus corresponding to the transmitting apparatus of FIG. 6 and a general receiving apparatus corresponding to the general transmitting apparatus of FIG. 2 can easily be constructed based on the above description.

As described above, on the transmission side of the radio communication system according to the invention, a k-bit parallel signal is divided into n signals, which are encoded, respectively. The encoded signals $I^1$–$I_n$ are given a phase difference of $\pi/2^n$ between two consecutive encoded signals $I_i$ and $I_{i+1}$. The resulting signals are subjected to the spectrum spreading and then added together, to produce a transmission digital signal. On the receiving side, reverse spreading is performed on a receiving signal. The reverse spread signals are given a phase difference of $\pi/2^n$, cancelling the phase shift of the transmission side, and then respectively decoded. Thus, the original k-bit parallel signal is reproduced. Therefore, the data transmission speed can be increased without increasing the multi-value index in the first modulation. It is sufficient to use a first modulation on a level of QPSK, and the bit error rate does not increase.

What is claimed is:

1. A ratio data communication system using a spread spectrum scheme, comprising:

converting means for converting a data signal to be transmitted to a k-bit parallel signal, where k is a predetermined integer equal to the value of 2 or greater;

encoding means for mapping each of k/n-bit signals to the signal point locations of a predetermined modulation scheme in order to output n encoded signals, the k/n-bit signals being obtained by dividing the k-bit parallel signal into n parts, where n is a predetermined integer equal to 2 or greater;

first phase shifting means for causing a phase difference of $\pi/2^n$ between any two encoded signals adjacent to one another among the n encoded signals;

spectrum spreading means for spreading each of the n encoded signals having said phase difference to output n spectrum spread signals;

combining means for combining the n spectrum spread signals to generate a digital transmission signal;

radio transmission means for transmitting a transmission wave based on the digital transmission signal;

radio receiving means for receiving the transmission wave to produce a digital receiving signal;

spectrum reverse-spreading means for reverse-spreading the digital receiving signal to produce n reverse-spread digital signals;

second phase shifting means for causing the removal of said phase difference of $\pi/2^n$ between any two reverse-spread digital signals adjacent to one another among the n reverse-spread digital signals, thereby cancelling said phase shift of the first phase shifting means; and decoding means for decoding each of the n reverse-spread digital signals phase-shifted by the second phase shifting means according to a demodulation scheme, to thereby reproduce the k-bit parallel signal.

2. The radio data communication system according to claim 1, wherein k/n=2, and the encoding means employs a QPSK modulation scheme.

3. The radio data communication system according to claim 1, wherein k/n=2, and the encoding means employs an 8-phase trellis modulation scheme.

4. The radio data communication system according to claim 1, wherein the spectrum spreading means comprises:

spreading code generators for generating n spreading codes corresponding to the respective encoded signals having said phase difference; and multipliers for multiplying together the n encoded signals and the corresponding spreading codes, respectively.

5. A transmitting apparatus comprising:

converting means for converting a data signal to be transmitted to a k-bit parallel signal, where k is a predetermined integer equal to the value of 2 or greater;

encoding means for mapping each of k/n-bit signals to the signal point locations of a predetermined modulation scheme to output n encoded signals, the k/n-bit signals being obtained by dividing the k-bit parallel signal into n parts, where n is a predetermined integer equal to the value of 2 or greater;

first phase shifting means for causing a phase difference of $\pi/2^n$ between any two encoded signals adjacent to one another among the n encoded signals;

spectrum spreading means for spreading each of the n encoded signals having said phase difference to output n spectrum spread signals;

combining means for combining the n spectrum spread signals to generate a digital transmission signal; and radio transmission means for transmitting a transmission wave based on the digital transmission signal.

6. The transmitting apparatus according to claim 5, wherein k/n=2, and the encoding means employs a QPSK modulation scheme.

7. The transmitting apparatus according to claim 5, wherein k/n=2, and the encoding means employs an 8-phase trellis modulation scheme.

8. The transmitting apparatus according to claim 5, wherein the spectrum spreading means comprises:

spreading code generators for generating n spreading codes corresponding to the respective encoded signals having said phase difference; and multipliers for multiplying together the n encoded signals and the corresponding spreading codes, respectively.

9. In a radio data communication system comprising:

converting means for converting a data signal to be transmitted to a k-bit parallel signal, where k is a predetermined integer equal to the value of 2 or greater; encoding means for mapping each of k/n-bit signals to the signal point locations of a predetermined modulation scheme to output n encoded signals, the k/n-bit signals being obtained by dividing the k-bit parallel signal into n parts, where n is a predetermined integer equal to the value of 2 or greater; first phase shifting means for causing a phase difference of $\pi/2^n$ between any two encoded signals adjacent to one another among the n encoded signals; spectrum spreading means for spreading each of the n encoded signals having said phase difference to output n spread signals; combining means for combining the n spread signals to generate a digital transmission signal; and radio transmission means for transmitting a transmission wave based on the digital transmission signal, wherein a receiving apparatus comprises:

radio receiving means for receiving the transmission wave to produce a digital receiving signal;

spectrum reverse-spreading means for reverse-spreading the digital receiving signal to produce n reverse-spread digital signals;

second phase shifting means for causing the removal of said phase difference of $\pi/2^n$ between any two reverse-spread digital signals adjacent to one another among the n reverse-spread digital signals, thereby cancelling said phase shift of the first phase shifting means; and decoding means for decoding each of the n reverse-spread digital signals phase-shifted by the second phase shifting means according to a demodulation scheme corresponding to the predetermined modulation scheme, to thereby reproduce the k-bit parallel signal.

10. The receiving apparatus according to claim 9, wherein k/n=2, and the decoding means employs a QPSK demodulation scheme.

11. The receiving apparatus according to claim 9, wherein k/n=2, and the decoding means employs an 8-phase trellis demodulation scheme.

12. The receiving apparatus according to claim 9, wherein the spectrum reverse-spreading means comprises:

spreading code generators for generating n spreading codes corresponding to the n reverse-spread signals phase-shifted by the phase shifting means; and multipliers for multiplying together the n reverse-spread digital signals and the corresponding spreading codes, respectively.

13. The radio data communication method according to claim 12, wherein k/n=2, and the k/n-bit signals are encoded according to an 8-phase trellis modulation scheme.

14. A radio data communication method using a spread spectrum scheme, comprising the steps of:

converting a data signal to be transmitted to a k-bit parallel signal, where k is a predetermined integer of 2 or more;

mapping each of k/n-bit signals to the signal point locations of a predetermined modulation scheme in order to output n encoded signals, the k/n-bit signals being obtained by dividing the k-bit parallel signals into n parts, where n is a predetermined integer equal to the value of 2 or more;

phase shifting the n encoded signals in order to cause a phase difference of $\pi/2^n$ between any two encoded signals adjacent to one another among the n encoded signals;

spreading each of the n encoded signals having said phase difference in order to output n spread signals;

combining the n spread signals to generate a digital transmission signal;

transmitting a transmission wave based on the digital transmission signal;

receiving the transmission wave to produce a digital receiving signal;

reverse spreading the digital receiving signal to produce n reverse-spread digital signals;

phase shifting the n reverse-spread digital signals in order to remove said phase difference of $\pi/2^n$ between any two reverse-spread digital signals adjacent to one another among the n reverse-spread digital signals, thereby cancelling the first phase shift; and decoding each of the n reverse-spread digital signals phase-shifted by the second phase shifting according to a demodulation scheme corresponding to the predetermined modulation scheme, to thereby reproduce the k-bit parallel signal.

15. The radio data communication method according to claim 14, wherein k/n=2, and the k/n-bit signals are encoded according to a QPSK modulation scheme.

* * * * *